Aug. 11, 1964    J. A. WELLER    3,143,836
POTTING AND PACKAGING MACHINE
Filed Aug. 17, 1961    2 Sheets-Sheet 2

INVENTOR.
JOHN A. WELLER
BY
ATTORNEYS

United States Patent Office 3,143,836
Patented Aug. 11, 1964

3,143,836
POTTING AND PACKAGING MACHINE
John A. Weller, P.O. Box 1111, Holland, Mich.
Filed Aug. 17, 1961, Ser. No. 132,188
2 Claims. (Cl. 53—124)

This invention relates to the packaging and potting of plants, and more particularly to an apparatus and a method for packaging plants, especially small plants, in a high-speed production manner.

Nurserymen, in order to compete effectively today in the wholesaling of small plants, must package and distribute a vast number of them during the active spring and fall seasons. Because the profit margin on small plants (e.g., one to twelve inches in length) is so small, the ability to package each plant rapidly and effectively with its roots protected in a preservative material and its foliage undamaged usually determines the success or failure of a nursery business.

Various apparatuses have been devised heretofore to accelerate the rate of packing and to alleviate the need for a large labor crew. Some of these apparatuses have constituted a significant advance in the art. However, most of them are limited to larger plants (e.g., longer than 12 inches). This conventional equipment is too cumbersome and complex to effectively manipulate a small plant into a package in its correct orientation without damaging it. Also, even the equipment capable of doing this fairly well, operates much too slowly and necessitates a large amount of manual labor.

Another factor limiting prior art apparatuses to larger plants involves the frictional forces created when the preservative material is compressed and shifted. For optimum preservation of the plant, the particulate preservative material must be pushed into the plant container at high pressures. This produces a frictional drag on the shifting preservative which surrounds the plant. This frictional force is so exceptionally large with small plants, relatively speaking, that the plungers used to shift them axially often jam against the plant foliage. Thus, packaging of small plants with conventional equipment is not very pratical.

When larger plants are packaged with these prior art devices, the effective placing of particulate preservative material (usually peat moss or a mixture of peat moss and saw dust) around the roots generally requires either (1) hand packing, or (2) depositing of the preservative material in one batch to place the plant on and then in a second batch on top of the plant. In the typical prior art devices, a concave elongated cover is manually swung in an arc over the top of the peat moss and plant placed in a lower elongated concave trough. With such apparatuses, the packaging of each plant requires a great deal of time and labor and is not adaptable to high speed automation.

Accordingly, it is an object of this invention to provide a packaging and potting apparatus capable of surrounding the roots of plants and placing them neatly in containers at a rapid rate. It does so efficiently and dependably. The apparatus is especially suited to packing small plants at high speed. The apparatus is capable of applying high pressure to the preservative, even on small plants, to obtain longer plant life and without damage to the plant during packaging. The only labor required is for feeding in the bare plants, applying the container, and removing the packaged product. It utilizes only straight line-reciprocating components rapidly and sequentially operable by power motors. The apparatus utilizes no swinging components and no linkages to slow it down or require manual operation. It is capable of placing plants in packages such as bags or the like, or alternatively in pots. The apparatus accurately centers the plant in the preservative material without any hand packing and without multiple depositing of preservative material.

It is another object of this invention to provide a novel method of rapidly packaging small plants. The method effects a dependable centering of the plans in the preservative material without multiple depositing of the preservative or hand packing. It is further readily adaptable to high speed automated operation.

These and other objects of this invention will be apparent upon studying the following specification in conjunction with the drawings, in which.

The inventive packaging apparatus basically comprises a flat plant-supporting bed, means for depositing preservative material on a plant lying directly on the flat bed, and a pair of reciprocating, elongated, concave scooping, forming and compacting members positioned laterally on opposite sides of the plant and facing each other. An axial shifting or plunger means in positioned adjacent the end of a plant placed on the bed to shift the plant axially into a container. The container is supported by a hollow, split-cone shaped guide and support means. The guide aligns the plant with the container as well as supporting the container. The forming members when mated define a chamber which is generally cylindrical and which preferably comprises a slightly tapered frustum with the larger diameter of the frustum adajcent the split-cone guide. Preferably a positive-acting opening means operates the normally closed guide. Also, a container holding means preferably keeps the container on the guide until the plant and preservative are in place.

The inventive method basically comprises the steps of placing a plant directly on a support bed, depositing preservative material in the general area around the roots of the plant, and then shifting a pair of forming members simultaneously toward the plant from both sides to scoop up preservative material, propel it around the plant roots, form it into the desired shape, and compress it. The plant and preservative are then axially shifted into a container. The preservative material is preferably compressed into a slightly tapered frustum with the larger diameter thereof being opposite the plant foliage and adjacent the container.

Figure 1:
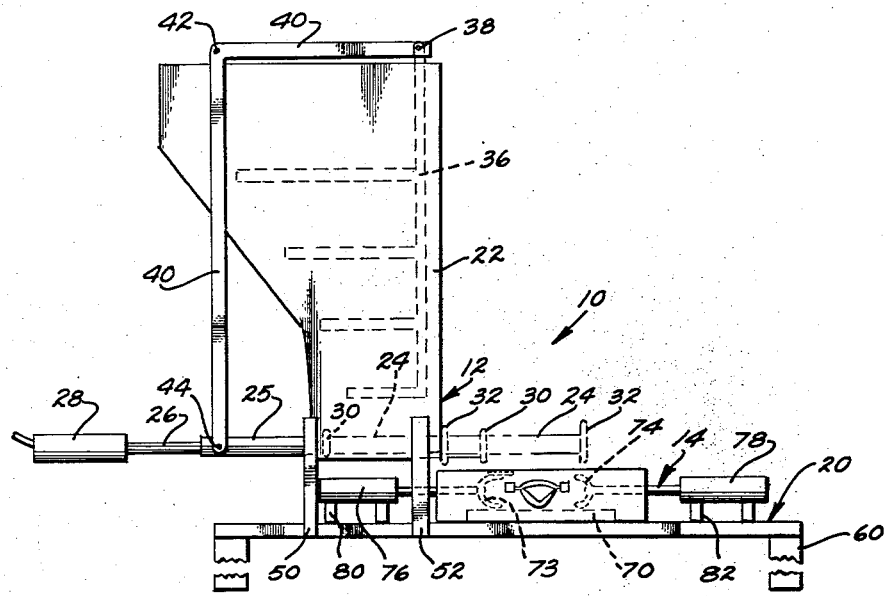
FIG. 1 is a side elevational view of the novel apparatus.
Figure 2:
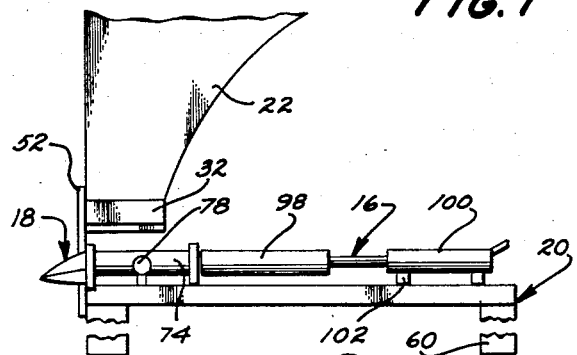
FIG. 2 is a fragmentary end elevational view of the apparatus illustrated in FIG. 1.

Referring now to FIG. 1, in the form of the invention there illustrated, the packaging apparatus 10 includes a preservative-material depositing-means 12, a scooping, compacting and forming means 14, an inserting means 16 (FIG. 2) and a plant guide and container supporting means 18, all mounted on a suitable platform 20 supported by legs 60.

Figure 3:
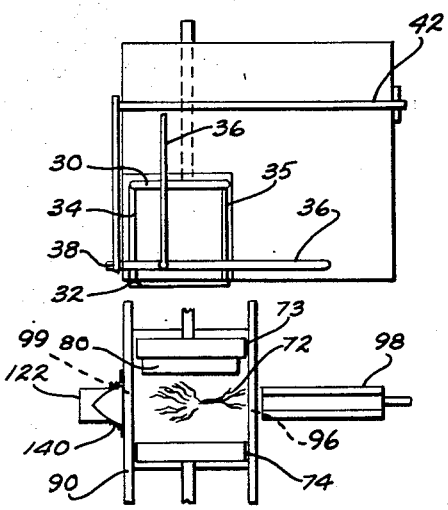
FIG. 3 is a fragmentary top plan view of the apparatus illustrated in FIGS. 1 and 2.

The peat moss supply means 12 includes a hopper 22 having a reciprocating dispenser means 24 slidable in the bottom thereof. The dispenser extends out the back of the hopper at 25 for connection to shaft 26 of air motor 28. The dispensing means includes rear baffle 30 and front baffle 32 connected by braces 34 and 35 (FIG. 3). The rear plate 30 comprises a shifting member for the peat moss. The front baffle 32 comprises a stopping and deflecting member for the accelerated peat moss. The bottom and top of the member formed by the baffles and braces are open. When retracted and resting on the bottom of the hopper, peat moss falls between the baffles. Upon being rapidly extended the rear baffle pushes the preservative out, which hits the front baffle and falls out the open bottom unto the roots of the plant.

Positioned within the hopper 22 is a suitable agitator 36. It is pivotally connected at 38 to a dog leg 40. Dog leg 40 is pivotally mounted on support rod 42 fixed to the hopper. Dog leg 40 is pivotally attached on its lower end 44 to portion 25 of the reciprocating dispensing means. The agitator 36 reciprocates simultaneously with actuation of dispensing means 24 since the horizontal movement of shaft 26 is translated into vertical movement of agitator 36 by dog leg 40. The hopper may be suitably supported above platform 20 by a plurality of sturdy brackets 50 and 52 fixedly attached to platform 20 and to hopper 22. Other equivalent mounting means for the hopper may obviously be substituted for this one shown.

Platform 20 may be supported on fixed legs 60 of desired length to maintain the assembly at proper working level for feeding the machine and removing the packaged product. Mounted upon the platform are forming means 14, shifting means 16, and plant guide and container support means 18. Affixed to platform 20 is a bed 70. This bed may alternatively be the upper surface of the platform 20 if desired. It serves to support a plant 72 (FIG. 3). Its flat surface also acts as a bearing surface for the reciprocating forming members 73 and 74.

Conventional piston-type air motors 76 and 78 are fixedly mounted on opposite sides of platform 20 by supports 81 and 82. Connected to the shafts of these motors are the respective forming members 73 and 74. These laterally positioned horizontally moving, facing members also serve as scoops and as compactors. These members are each generally semi-cylindrical in configuration. This geometrical designation is also intended to include slight modifications of the cylinder such as many sided polygons (e.g. octagon). When placed in contact, members 73 and 74 form a chamber therebetween. Mounted on top of one of the forming members 73 is a cover plate 80 which extends over the slight opening between the semi-cylinders just before they meet and while they are scooping and starting to compress. This plate stops the pressed preservative material from flying out the top before the fast moving members can be brought completely together. It should be noted that the several air motors used can obviously be replaced by other suitable units such as electric solenoids, for example.

It has been found to be important when packaging small plants that the chamber formed between the members actually be a slightly tapered frustum with the larger diameter adjacent the container and the smaller diameter adjacent the plant foliage. The friction of the compressed preservative against the forming members is substantially reduced by so doing. This allows great speed of plant discharge in a manner to be described hereinafter. Further, it allows increased pressure on the preservative to obtain longer plant life. The amount of taper from the smaller diameter end of the frustrum 77 to the larger diameter end 79 need be only a few degrees to be effective, and thus is not visible in the drawings.

Adjacent the forming members and affixed to the bed 70 or the platform 20 are a pair of parallel, vertical plates 90 and 92. In flange 92 is an opening 96 for entrance of plunger 98. This plunger is shown as a hollow cylindrical member having a longitudinal cut-out along the top. (See FIG. 7). This construction enables contact between the plunger and the preservative, but not the centrally positioned plant foliage. Another plunger construction which works very advantageously is similar to the one shown, but with the bottom portion of the plunger cut out to allow gravity disposal of peat moss tending to accumulate in the plunger. Other conventional configurations may be used if desired. The plunger is powered by a conventional piston-type air motor 100 mounted on suitable supports 102 affixed to platform 20.

Figure 6:
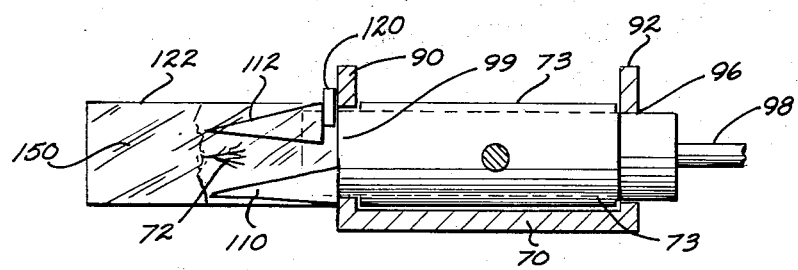
FIG. 6 is a fragmentary sectional view taken on plane VI—VI of the apparatus illustrated in FIG. 5.

Positioned opposite the opening 96 and plunger 98 is an opening 99 in plate 90. Guide means 18 is mounted on the outer surface of plate 90 around the opening. This combination guide-means and container-support-means is formed generally like a hollow, split cone. Preferably, the upper and lower surfaces are flattened somewhat so that the guide roughly resembles a duckbill. It preferably includes a lower fixed jaw 110 (FIG. 6) and a pivotal upper jaw 112. The upper jaw is mounted at its larger end on rods 113 and 115 (FIG. 4) rotatable in pillow blocks 117 and 119 secured to plate 90. The bill is normally in the closed position shown in FIG. 2. It may be moved to the open position shown in FIG. 7. The upper jaw preferably has an arcuate stop 120 for a container 122 placed over the guide.

Operation

When utilizing the apparatus, each of the four air motors 28, 76, 78 and 100 are connected to a source of pressurized air (not shown). For this purpose, platform 20 and legs 60 may be hollow to form an air reservoir for a conventional compressor if desired. A suitable timer (not shown) composed of a rotating cam operating electrical switches may be used to open and close conventional solenoid valves. These valves allow passage of compressed air first to dispensing means motor 28, then to forming member motors 76 and 78 simultaneously, and then to plunger motor 100. Alternatively, manual valves may be used. Or if desired, the several operations may be operated by the motors being actuated in a sequential manner. That is, operation of the dispenser would close a switch to actuate the valves to the motors for the forming members; and operation of the forming members would close a switch to actuate a valve for the plunger.

When it is desired to insert plant 72 into a container 122, the container is placed over the mating jaws 110 and 112. The container may comprise a plastic bag, a flower pot, or any other suitable container. It is here shown as a transparent plastic bag. It is preferably placed on the jaws and the top may be ruffled up as shown in FIG. 3 at 140. The ruffling enables the bag to extend upon the entrance of preservative material. This reduces the tendency to trap air in the bottom of the bag which may split the bag and prevent proper packaging.

Figure 4:
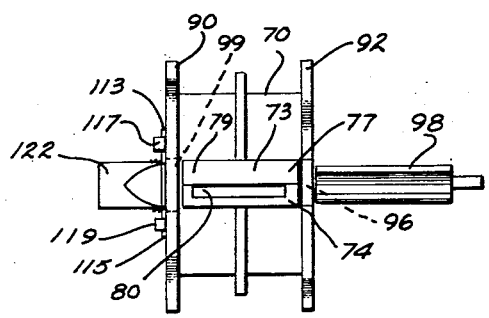
FIG. 4 is a fragmentary top plan view of the packaging apparatus with the preservative material being compacted around the plant.

Plant 72 is laid directly upon bed 70 with the roots toward guide means 18 and the foliage toward plunger 98. Then compressed air is supplied to motor 28. Motor 28 shifts shaft 26 toward hopper 22 and thus pushes dispensing means 24 out of the hopper as shown in phantom in FIG. 1. Rear baffle pushes peat moss ahead of it until the end of the travel is reached. Part of the moving peat moss falls directly out the bottom and part continues until it hits baffle 32 to be deflected downwardly. It thereby falls on top of and adjacent the roots of plant 72. Motor 28 is then retracted. Thereafter, compressed air is supplied simultaneously to motors 76 and 78. These motors drive forming members 73 and 74 toward each other at a fairly rapid speed until they meet as shown in FIG. 4. These members, as they pass across the bed, scoop up the peat moss, propel it all the way around the roots, form it into the shape of the chamber defined thereby, and compress the peat moss around the roots with the plant having been lifted to the center of the peat moss.

In spite of the fact that the plant is placed directly on the plain flat bed, it has been found that by using the laterally positioned scooping and forming members, the plant actually is accurately centered in its preservative. Just how this occurs is not fully understood, but the fact remains that it does occur dependably with the compression of the preservative around each and every plant.

Figure 5:
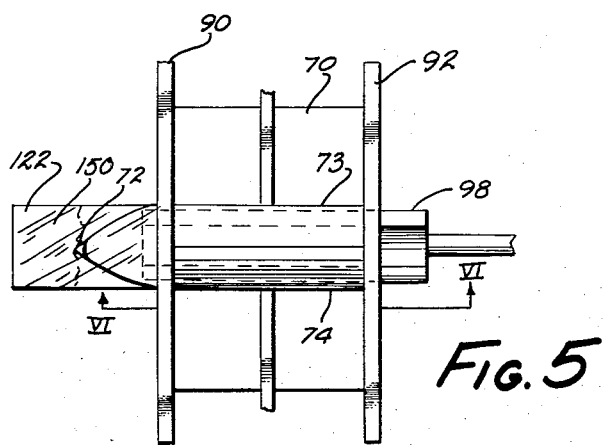
FIG. 5 is a fragmentary top plan view of the apparatus illustrated in FIG. 4 during the axial shifting of the plant and preservative material into a container.

After compressing the preservative around the plant's roots, members 73 and 74 are retained in this extended position until after plunger 98 has shifted. Motor 100 is actuated immediately after the compression of the preservative material to extend plunger 98 through opening 96 in plate 92 as shown in FIG. 5. The external diameter of plunger 98 is slightly smaller than the internal diameter of the chamber formed by members 73 and 74. Thus, it slides readily therethrough to shift the compressed preservative material holding plant 72 through opening 99. The foliage of the plant extends into the hollow center of the plunger and escapes damage. Upper jaw 112 is forced upward by the moving, compressed peat moss (FIG. 6) to allow the plant and preservative to be pushed into container 122. As the peat moss 150 passes into the bag 122, the latter unfolds off guide 18 such that the packaged plant is automatically removed from the guide almost simultaneously with the end of the plunger stroke.

By making the chamber formed by members 73 and 74 of a smaller diameter adjacent the plant foliage, it has been found that the compressed material slides out of the compression members with little resistance and without any jamming. After the plant has been placed securely in the bag 122, motors 100, 76 and 78 are retracted to return the forming members and the plunger to the original position.

Thereafter the apparatus is ready for another cycle of operation. If desired, the top of the bag 122 may be closed around the stem of the plant (e.g., for plants with stemless roots). However, it has been found that with this apparatus the peat moss can be compacted tightly enough into the container to withstand the jars of normal handling and shipping without disturbance of the plant, so that the top need not be ordinarily closed.

The novel packaging apparatus serves equally well to package plants having no stems but only fragile eyes. Such plants can be placed on the bed with the roots facing the plunger and the eyes facing the bag. In this instance the bag can be provided with holes or openings at the bottom for ventilation. The bag further would not be ruffled unto the guide. The plunger could be a solid cylinder. When the plant and preservative are shifted into the bag, a space is left at the bottom for the eyes, with the open end of the bag being sealed to prevent drying of the plant roots.

*Modification*

Figure 7:
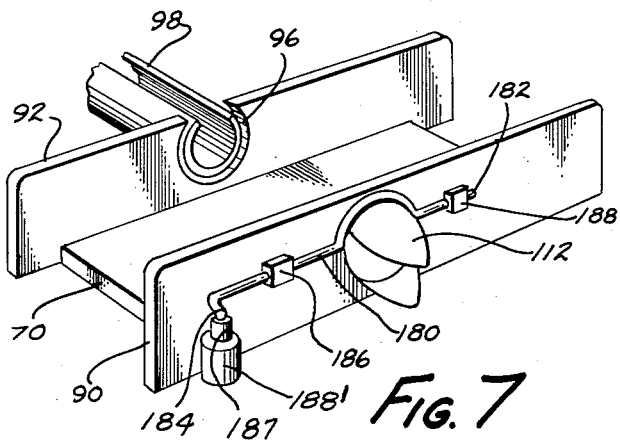
FIG. 7 is a fragmentary perspective view of the packaging apparatus illustrating a positive opening mechanism for the split-cone guide and container-supporting means.

Referring to FIG. 7, a positive opening device for the upper jaw 112 is there shown. In this modification, an elongated rod 180 is fixedly connected to jaw 112, and rotatable in pillow block 186. Rod 182, rotatable in block 188, supports the other side. Both blocks 186 and 188 are fixedly secured to plate 90. Rod 180 includes an outer end 184 at an angle with respect to the remainder of the rod. End 184 contacts vertical shaft 187 of a small piston-type air motor 188' mounted on plate 90. This air motor is preferably actuated simultaneously with air motors 76 and 78 controlling semi-cylinders 73 and 74. The chief purpose of this structure is to assure opening of the duckbill before plunger 98 is actuated. If the plunger shifts without any peat moss in the plant, (e.g., if the hopper is empty) and this positive opener is not provided, the upper bill 112 may be broken by the advancing plunger. This is because the pressure normally applied by the shifting peat moss is not present to gradually open the duckbill. With the motor 188' and the lever action of rod 180, the bills are positively opened each cycle of the apparatus to eliminate the possibility of damage.

Figure 8:
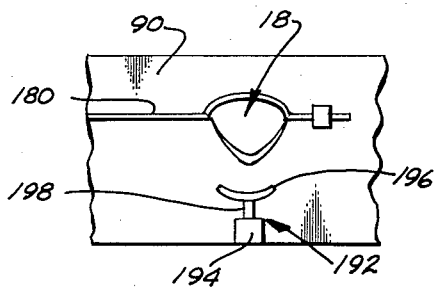
FIG. 8 is a fragmentary side elevation view of the guide and a positive package holding means.

Another modification of the apparatus is shown in FIG. 8. This comprises a holding means for a container placed on the split-cone guide means and container support 18. The holding means comprises a small air motor 194 mounted to plate 90, and an arcuate shoe 196 mounted on the end of reciprocating shaft 198. The curvature of the concave shoe 196 is complementary to the convex curvature of the lower bill of the guide means. By shifting the shoe upwards against the lower bill after a container is placed on the guide, the container will be held securely while the plunger pushes the plant and preservative material into it. Motor 194 will be actuated prior to the plunger movement.

Various other obvious modifications of the apparatus illustrated will readily appear to those skilled in the art. These obvious modifications form part of this invention, which is not to be limited by the material illustrated, but only by the scope of the appended claims and the reasonably equivalent structures to those defined therein.

I claim:

1. A plant packaging machine comprising: a flat support bed for a plant and preservative material; a dispensing means for depositing material on the roots of said plant; a pair of generally semi-cylindrical forming members reciprocable together over the flat surface of said bed to scoop said material up, propel it around the roots of said plant, form it and compact it; power motor means to operate said reciprocating members; plunger means shiftable through said contacted forming members to push said compacted material and plant out from between said members; power motor means for operating said plunger means; a guide means positioned opposite said plunger means for receiving and passing said material and plant; said guide means comprising a normally closed hollow, split cone structure; and said cone being capable of receiving a container thereover, and of opening to allow the passage of a plant therethrough into a container; and reciprocable clamping means to hold said container on said guide means.

2. A plant packaging machine comprising: a flat support bed for a plant and preservative material; a dispensing means for depositing material on the roots of said plant; a pair of generally semi-cylindrical forming members reciprocable together over the flat surface of said bed to scoop said material up, propel it around the roots of said plant, form it and compact it; power motor means to operate said reciprocating members; plunger means shiftable through said contacted forming members to push said compacted material and plant out from between said members; power motor means for operating said plunger means; a guide means positioned opposite said plunger means for receiving and passing said material and plant; said guide means comprising a normally closed hollow, split cone structure; and said cone being capable of receiving a container thereover, and of opening to allow the passage of a plant therethrough into a container, and positive powered opening means for said guide means.

References Cited in the file of this patent

UNITED STATES PATENTS

| 1,664,913 | Bewley | Apr. 3, 1928 |
| 2,112,872 | Wilson | Apr. 5, 1938 |
| 2,337,406 | Opie | Dec. 21, 1943 |
| 2,628,753 | Field | Feb. 17, 1953 |
| 2,847,808 | Romine | Aug. 19, 1958 |
| 2,907,157 | Romine | Oct. 6, 1959 |
| 3,001,345 | Zeller | Sept. 26, 1961 |
| 3,078,628 | Ready | Feb. 26, 1963 |

FOREIGN PATENTS

| 1,006,581 | France | Jan. 23, 1952 |
| 733,423 | Great Britain | July 13, 1955 |